March 1, 1927.  1,619,696
E. W. BOWEN
MECHANISM FOR CONVERTING ROTARY MOTION INTO COMBINED
RECIPROCATING AND OSCILLATING MOTION AND VICE VERSA
Filed Jan. 3, 1924   2 Sheets-Sheet 1
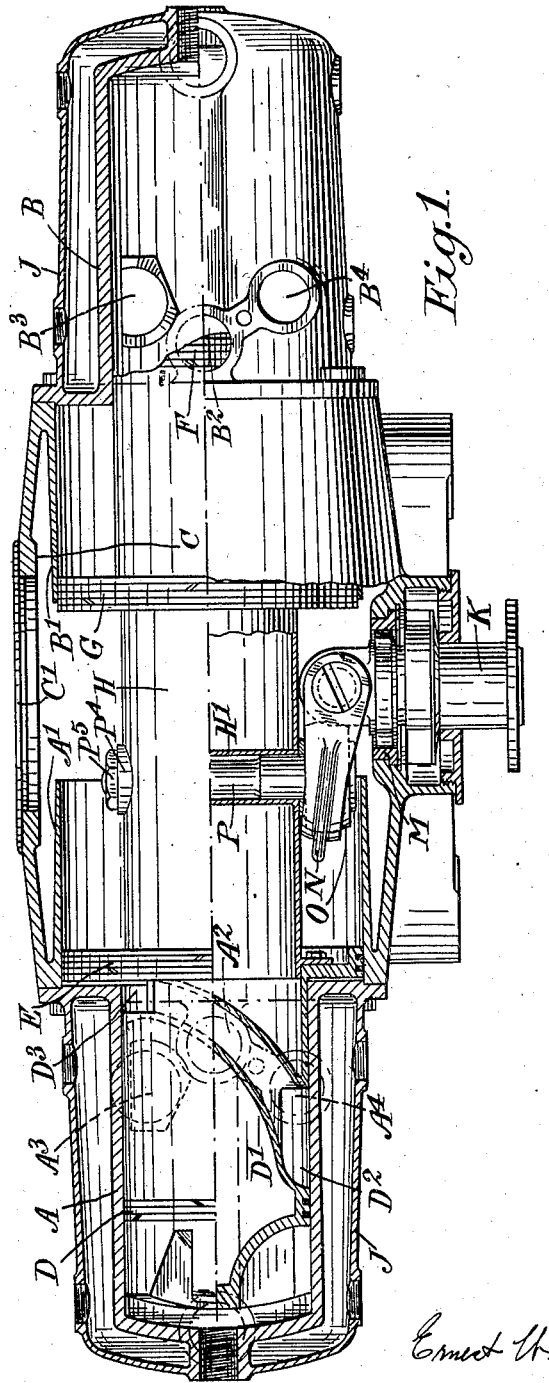

March 1, 1927.
1,619,696
E. W. BOWEN
MECHANISM FOR CONVERTING ROTARY MOTION INTO COMBINED
RECIPROCATING AND OSCILLATING MOTION AND VICE VERSA
Filed Jan. 3, 1924    2 Sheets-Sheet 2
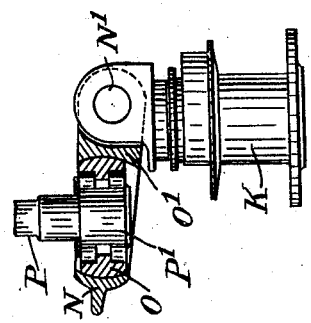
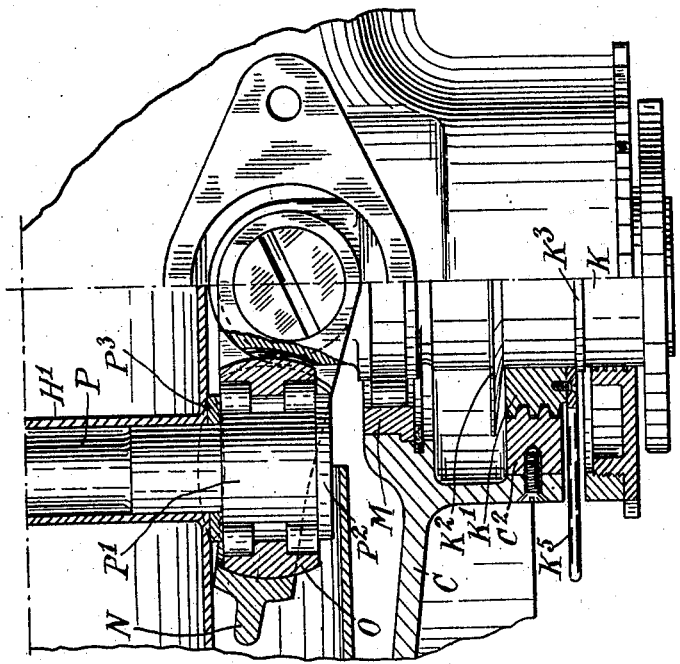

Patented Mar. 1, 1927.

1,619,696

UNITED STATES PATENT OFFICE.

ERNEST WINDSOR BOWEN, OF CHISWICK, LONDON, ENGLAND.

MECHANISM FOR CONVERTING ROTARY MOTION INTO COMBINED RECIPROCATING AND OSCILLATING MOTION AND VICE VERSA.

Application filed January 3, 1924, Serial No. 684,216, and in Great Britain January 18, 1923.

This invention is for improvements in or relating to mechanism for converting rotary motion about one axis into combined reciprocating and oscillatory angular motion about another axis, and vice versa, and the type of such mechanism to which the invention relates is that wherein a reciprocatory member, such as a piston, plunger or the like, operating in a cylinder is operatively connected, at a point situated to one side of its longitudinal axis, to one end of a link constituting a crank arm of a shaft to which the other end of the crank arm is pivoted.

An important object of the invention is to provide an improved construction of crank mechanism of the type referred to particularly adapted for use in internal-combustion engines, air compressors, pumps and the like. Another important object is to provide mechanism of the type described comprising a crank shaft, wherein the effective throw or radius of the crank arm or crank pin can be readily varied.

Heretofore it has been proposed to provide an internal-combustion engine of the horizontally opposed type in which means were provided for imparting an oscillating rotary movement about the longitudinal axis of the cylinder to one of two pistons reciprocable oppositely in the cylinder, and in one construction of such engines a crank arm pivoted to the shaft was operatively connected with the skirt of the one piston by means of a self-aligning ball-bearing provided in an aperture in the skirt. In this known construction, however, the pivotal connection of the crank arm with the shaft was situated within the skirt of the piston, so that the crank shaft necessarily had some overhang and the length of the crank arm was limited by the radius of the skirt to which it was connected.

According to an important feature of this invention there is provided mechanism of the kind described characterized in that the point of connection of the crank arm with the reciprocatory member is situated on the same side as that whereon the shaft is disposed, for the purpose of enabling the overhang of the crank shaft to be reduced to a minimum.

According to another important feature of the invention the crank mechanism described in the preceding paragraph is characterized by the fact that the shaft is arranged to be itself adjustable longitudinally of its axis and at right angles to the direction of reciprocation of the reciprocatory member, in order to permit or effect the angular adjustment of the crank arm in relation to its shaft whereby the effective throw of the crank can be varied.

Conveniently, a pin pivotally connected at one end with the crank arm extends transversely through the reciprocatory member, and means is provided for adjusting the endwise position of the pin in relation to said reciprocatory member.

Other features of the invention will be described hereinafter and pointed out in the claims.

In order that the invention may be clearly understood reference will be made by way of example, to the accompanying drawing showing the invention applied to an internal-combustion engine. It is to be understood however, that the invention is not limited to the precise constructional details enumerated in the drawing:

Figure 1 is a plan view partly in horizontal section, showing one form of horizontal, opposed piston, two stroke cycle internal-combustion engine, comprising crank mechanism according to the invention; and Figure 2 is a horizontal section of the crank shaft shown in Figure 1, but on a larger scale, provided with means for moving the shaft in the direction of its longitudinal axis.

Figure 3 is a detail view partly in section showing a slightly modified form of construction of the crank mechanism.

Like reference letters designate like parts in both views.

Referring to the drawing, two working cylinders A, B, are mounted on a central frame C. At the inner end of each cylinder is a skirt $A^1$, $B^1$ directed towards one another and formed on the frame C, which skirts constitute each a pump chamber for its allotted cylinder. A two-diameter piston D, E, is reciprocable in the cylinder A and pump chamber $A^1$, and a two-diameter piston F, G, is reciprocable in the cylinder B and the pump chamber $B^1$. These pistons are connected together by a cylindrical trunk H constituting a skirt common to the two pump pistons E, G. The pistons D, F, constitute power pistons, and the pistons E, G, constitute pump pistons. The cylinders are water-jacketed as usual, as shown at J, and the frame C has an inspection plate C¹ in its middle portion.

A power shaft K that lies with its longitudinal axis at right angles to the longitudinal axis of the cylinders is journalled in a roller bearing M in the frame C in such a manner that it can be adjusted in the direction of its length. On the end of the shaft within the frame C but outside the trunk H is mounted one end of a U-shaped link N that can swing about an axis lying transversely of the longitudinal axis of the shaft. The other end of this link N, which constitutes a crank arm, is pivotally connected by a self-aligning roller bearing O to one end P¹ of a wrist pin P that is adjustably mounted in a tube H¹ situated centrally in the trunk H and lying along a diameter thereof, so that the longitudinal axis of the pin P intersects the longitudinal axis of the cylinders at right angles.

In the construction shown in Figures 1 and 2 the crank arm or link N is connected with an end lug on the power shaft K by a transverse pin or bolt N¹ whose axis lies transversely of and intersects the longitudinal axis of the shaft K, but in many if not in most cases it will be found advantageous to offset the connecting lug and pin or bolt N¹ with respect to the longitudinal axis of the shaft K as shown in Figure 3, as by this means the maximum accommodation may be provided for the self-aligning bearing O in the crank arm N, and room for a large bearing area afforded even when the throw of the crank is small.

Furthermore the crank arm or link N can also be made much stronger without increase of weight by the offset described as a solid part O¹ can be left between the bifurcated end and the bearing which not only strengthens the crank arm but also relieves the pin N¹ of the duty of counteracting any tendency of the bifurcated end portion of the arm to open under load. Moreover the weight of that part which is offset serves to balance partly the other portion of the crank arm and if desired could be further extended for balancing purposes. Another advantage of the offset is that it reduces the angularity of the crank arm with the power shaft in all positions.

In general the amount of the offset for any given throw of crank would be controlled by the bearing area required around the crank pin, the angularity, and the weight to be balanced.

As clearly shown in Figure 2, the part P¹ of the pin P surrounded by the spherical bearing O terminates at its outer end in a head P² and has at its inner end a shoulder against which bears a distance piece P³ in the form of a washer. The other end of the pin P carries a washer P⁴ and a nut P⁵, by which the pin is securely held in the tube H¹. The washers P³, P⁴, have their inner faces shaped to the outer periphery of the trunk H against which they lie, and by changing the washer P³ for another of a different thickness the distances of the bearing O from the longitudinal axis of the cylinders can be varied. Thus the angle which the crank arm N makes with the shaft in a given position of the pistons can be varied.

Provision may also be made for varying this angle by shifting the shaft K in the direction of its longitudinal axis. As shown in Figure 2 this may be done by mounting a sleeve K¹ free on the shaft between two collars or flanges K², K³, and causing it to engage by means of an external thread with an internally threaded member C² constituting a nut fixed on the frame C. The two members K¹, C² constitute worm gearing which can be operated by a handle K⁵ on the sleeve extending to the outside of the nut C² and the part of the frame C enclosing it.

One arrangement of inlet, exhaust and transfer ports will now be described, but it is to be understood that any other convenient arrangement of them may be used, particularly any arangement analogous to that adopted when a single sleeve valve is employed which has a combined oscillatory and reciprocatory movement about its longitudinal axis.

Each cylinder A, B, has at its pump chamber end an inlet port A², B² respectively, which may be connected together by a fuel supply pipe, not shown, that leads to a carburettor. Each cylinder A, B, is also provided with an exhaust port A³, B³ respectively, and a transfer port A⁴, B⁴ respectively, which exhaust and transfer ports are situated in their respective cylinders in substantially the same diametrical plane and nearer the closed ends thereof than are the inlet ports. The two exhaust ports A³, B³ may be connected together by an exhaust pipe, not shown, outside the cylinders, and the two transfer ports A⁴, B⁴ are connected together by a transfer conduit outside the cylinders. The power piston D has a transfer passage D¹, and the power piston F has a corresponding transfer passage. These passages lead each from a rectangular transfer port, such as D² in the side of the piston near the piston head to a port such as D³ in the other side of the power piston where it adjoins the head of the pump piston, so that the transfer passage of each power piston is always in communication with the allotted pump chamber.

Preferably the head of each power piston has a hollow portion extending axially beyond its rings, the peripheral wall of which hollow portion is not circular but is shaped to provide pockets or recesses for deflecting incoming compressed air towards the head of the cylinder in which the piston works to assist in effecting good scavenging.

The operation of the engine will now be described.

It will be assumed that the pistons are in the position shown in the drawing, and that a charge of fuel and air has been compressed by the piston D in the cylinder A. Owing to the described crank mechanism each point of each piston moves in an elliptical path, and the transfer port D² is still in communication with the transfer port A⁴, so that a charge is being supplied into the working cylinder B through the transfer port B⁴ which has been opened by the piston F. After the explosion has occurred and during the working stroke of the piston D, communication between the transfer ports D² and A⁴ is closed, then the transfer port D² communicates with the inlet port A², so that a fresh charge is sucked into the pump chamber A¹ by the piston E therein. The pistons D, E are then nearly at the upper end of their stroke, in which position the exhaust port A³ is opened, and then the transfer port A⁴ owing to the rotation of the pistons, so that a fresh charge is transferred into the cylinder A from the pump chamber B¹ by way of the transfer port B⁴. On the inward stroke of the pistons D, E, the exhaust port A³ and the transfer port A⁴ are closed and the communication between the transfer port D² and inlet port A² is cut off. The charge in the cylinder A is compressed while the exhaust port remains closed and the transfer port A⁴ is first closed and then in communication with the port D², so that the charge already sucked into the pump chamber A¹ is compressed and transferred to the cylinder B during the latter part of the working stroke of the piston F. A similar cycle of operations occurs in the cylinder B and pump chamber B¹.

It will be apparent that in an engine constructed as described above the overhang of the crank shaft can be reduced to a minimum, the length of the crank arm is not limited to the radius of the said trunk as would be the case if the crank arm were located inside the trunk, and the mechanism can be designed that the elliptical path along which the centre of the self aligning bearing moves can be varied in relation to its length. In other words, the amount of oscillatory rotary movement imparted to the pistons can be made small whereby the ports in the cylinders and pump chambers can conveniently be made of adequate area. Owing to the power shaft being adjustable axially, the size of the combustion space can be adjusted conveniently.

It will be appreciated that the invention is applicable not only to two stroke cycle internal-combustion engines, but also to four-stroke engines, air compressors, pumps and the like.

I claim:—

1. In mechanism of the class described, a cylinder, a reciprocatory member mounted within said cylinder, a shaft disposed laterally of said cylinder, a crank arm pivotally connected to the shaft, a self-aligning bearing in said crank arm, a pin connecting the bearing with the reciprocating member on the same side of the member as that on which the shaft is located, and means whereby said shaft can be adjusted longitudinally of its axis.

2. In mechanism of the class described, a cylinder, a reciprocatory member mounted within said cylinder, a shaft disposed laterally of said cylinder, a crank arm pivotally connected at one end to the said shaft, a spherical bearing in the other end of the crank arm, roller bearings within said spherical bearing and a pin journalled in said roller bearings connecting the bearings with the reciprocating member on the same side of the member as that on which the shaft is located.

3. In mechanism of the class described, a cylinder, a reciprocatory member mounted within said cylinder, a shaft disposed laterally of said cylinder, a crank arm pivotally connected at one end to the said shaft, a spherical bearing in the other end of the crank arm, roller bearings within said spherical bearing, a pin journalled in said roller bearings connecting the bearings with the reciprocating member on the same side of the member as that on which the shaft is located, and means whereby said shaft can be adjusted longitudinally of its axis.

4. In mechanism of the class described, a reciprocating element arranged for movement in a right line, a power shaft arranged with its axis at right angles to that of the reciprocating element, a bearing member for said shaft, a fixed member with which said bearing member is threadedly connected, means to turn said bearing member and thereby longitudinally adjust said shaft, a pin carried by said reciprocating member and a crank arm engaged by said pin and attached to said shaft.

5. In mechanism of the class described, a pair of opposed cylinders, a pair of opposed pistons mounted therein, a shaft disposed laterally of said cylinders, an offset connecting lug on the end of the said shaft, a crank arm connected to said opposed pistons and on the same side as that where said shaft is located, and pivoted to the said offset lug, and means whereby said shaft can be adjusted longitudinally of its axis.

6. Mechanism of the class described and according to claim 5 including a connecting member for said opposed pistons, a pin pivotally connected at one end wih the crank arm and extending transversely through the said connecting member, and means to allow for the endwise adjustment of said pin in relation to said pistons.

7. In mechanism of the class described, a pair of opposed cylinders, a pair of opposed pistons mounted therein, a shaft disposed laterally of said cylinders, a crank arm connected to said opposed pistons and on the same side as that where said shaft is located, and coupled to said shaft a connecting member for said pistons, a pin extending transversely through the said connecting member, a self-aligning bearing for the end of the crank arm remote from said shaft, carried by said pin, and adjustable in a direction at right angles to the direction of reciprocation.

8. Mechanism of the class described comprising a pair of opposed cylinders, a pair of opposed pistons mounted therein, a shaft disposed laterally of said cylinders, a crank arm connected to said opposed pistons and on the said side as that where said shaft is located, and coupled to said shaft, and means whereby said shaft can be adjusted longitudinally of its axis, embracing a worm gearing whereof one member is free on said shaft, and a second member fixed in relation to said shaft with which said worm gearing engages.

9. In mechanism of the class described, a reciprocating element arranged for movement in a right line, a power shaft arranged with its axis at right angles to that of the reciprocating element, a bearing member for said shaft, a fixed member with which said bearing member is threadedly connected, means to turn said bearing member and thereby longitudinally adjust said shaft, a pin carried by said reciprocating member and a crank arm engaged by said pin and attached to said shaft.

In testimony whereof he has affixed his signature.

E. WINDSOR BOWEN.